Jan. 15, 1924.

F. R. ASHLEY

SHOCK ABSORBING DEVICE FOR GATES

Filed June 29, 1922

1,480,649

Inventor
Frank R. Ashley
by James R. Hodder
Attorney

Patented Jan. 15, 1924.

1,480,649

UNITED STATES PATENT OFFICE.

FRANK R. ASHLEY, OF DENVER, COLORADO.

SHOCK-ABSORBING DEVICE FOR GATES.

Application filed June 29, 1922. Serial No. 571,637.

*To all whom it may concern:*

Be it known that I, FRANK R. ASHLEY, a citizen of the United States and resident of Denver, in the county of Denver and State of Colorado, have invented an Improvement in Improved Shock-Absorbing Devices for Gates, of which the following description, in connection with the accompanying drawings, is a specification, like letters on the drawings representing like parts.

My present invention relates to gate operating means, and more particularly to an improved shock absorbing spring control for automatic gate operating means.

In my copending applications, Serial No. 526,933, filed Jan. 4, 1922, and Serial No. 563,164, filed May 24, 1922, I have described and claimed an improved automatic gate operating means adapted for farm or shop gates of any description, and while such automatic gate operating means has proved successful in practice the construction therein disclosed is open to the objection that the gates are liable to be injured owing to the force with which they are opened and the suddenness with which they are brought to rest, both in the open and closed positions. Of necessity such gates must have a limited movement and therefore limiting stops must be provided therefor, but it is essential that some means be devised to either bring the gates to a gradual stop as they appoach the limits of their travel, or else provide some means for absorbing the shock of the blow with which the gates strike the limiting stops, and in the absence of one or the other of these suggested means, the gates are liable to be badly injured and their life shortened.

The idea of gradually stopping the travel of the gates as they approach their limiting stops does not appear to be feasible as it slows down the time taken to either open or close the gate, and I have, therefore, devised an improved shock absorbing means whereby not only is the danger of injury to the gate obviated, but the time of travel of the gate from its open to its closed, or from its closed to its open position is materially shortened.

The principal object of my invention, therefore, is an improved shock absorbing means for automatic gate operating mechanism.

Other objects and novel features of the construction and arrangement of parts will appear as the description of the invention progresses.

In the accompanying drawings—

Figure 2:
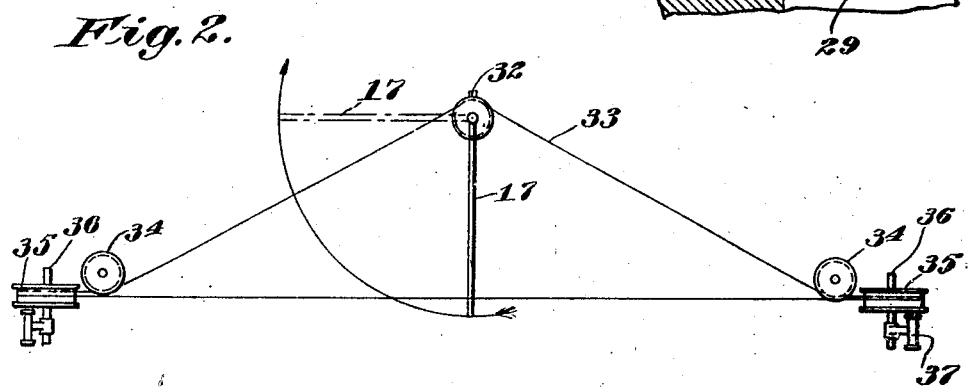
Fig. 2 is a plan view.
Figure 3:
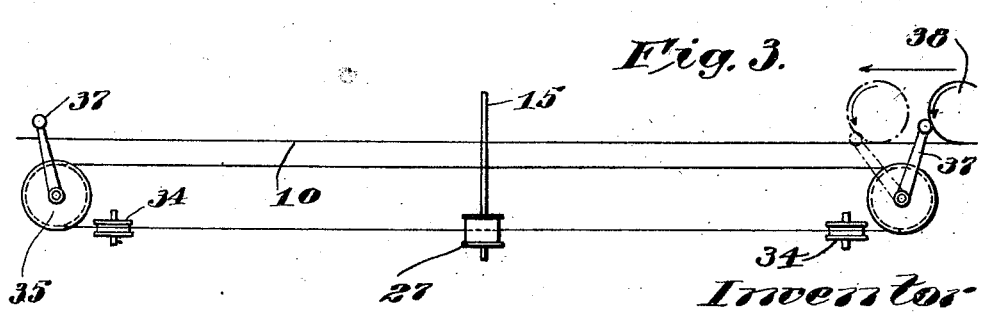
Fig. 3 is an elevation in schematic form showing an automatically operated gate to which my invention has been applied.

Referring to the drawings, 10 designates the upper surface of a roadway of suitable width, and at one side thereof is a pit 11 having sunk therein a post 12 to which is secured a bracket 13, this bracket being provided on its upper face with a thrust bearing 14, a gate post or shaft 15 being mounted for rotation in the bracket 13 and having secured at a point intermediate its ends one portion of the thrust bearing 14. Secured to the gate post or shaft 15 by plates 16, but one of which is shown, is a gate 17 which extends in its normal or closed position transversely across the roadway 10. Sunk in the roadway 10 at one side thereof, if the gate 17 is to be a single gate, and approximately at the center of the roadway 10, if the gate 17 is to be one unit of a double gate, is a latch 18 which cooperates with a latch member 19 pivotally secured at 20 to the lower portion of the gate 17, the end of the latch member 19 adjacent the latch 18 being vertically slidable in a member 21 secured to the side of the gate 17. To the other end of the gate is attached one end of a flexible member 22 which passes through perforations in lugs 23 formed integral with a bracket 24 clamped to the gate post or shaft 15 above the bracket 13 by bolts or set screws 25, the lower end of this flexible member 22 being attached by bolt 26 to the periphery of a pulley 27 that is loosely mounted upon the gate post or shaft 15 below the bracket 13. Adjacent the lower end of the gate post or shaft 15 is a collar 28, this collar being secured to the post or shaft 15 by set screw 29. Lying between the collar 28 and loose pulley 27 is a sleeve 30 and this sleeve may be secured to, or loosely mounted on, the gate post or shaft 15. The lower end of the loose pulley 27 is reduced in diameter to approximately that of the collar 28 while the diameter of the sleeve 30 is slightly less than the reduced portion of the loose pulley 27 or of the collar 28 to allow compressive movement of a helical spring 31, one end of which is fast to the reduced portion of the loose pulley 27 while the other end is secured to the collar 28. Secured to the loose pulley 27 by bolt 32 is a cable 33 that passes over idler wheels 34 and over pulleys 35 secured to shafts 36. Referring specifically to Figs. 2 and 3, it will be noted that the shafts 36 are mounted transversely of, and under, the roadway 10 and at a suitable distance on each side of the gate 17 so as to permit the gate 17 to have ample room to open or close to its fullest extent as a vehicle approaches or recedes from such gate. Secured to the shafts 36 and extending upwardly above the surface of the roadway 10 are operating levers 37, the upper end of these levers being adapted to be engaged by the wheel 38 of a vehicle as the vehicle approaches or recedes from the gate 17.

Figure 1:
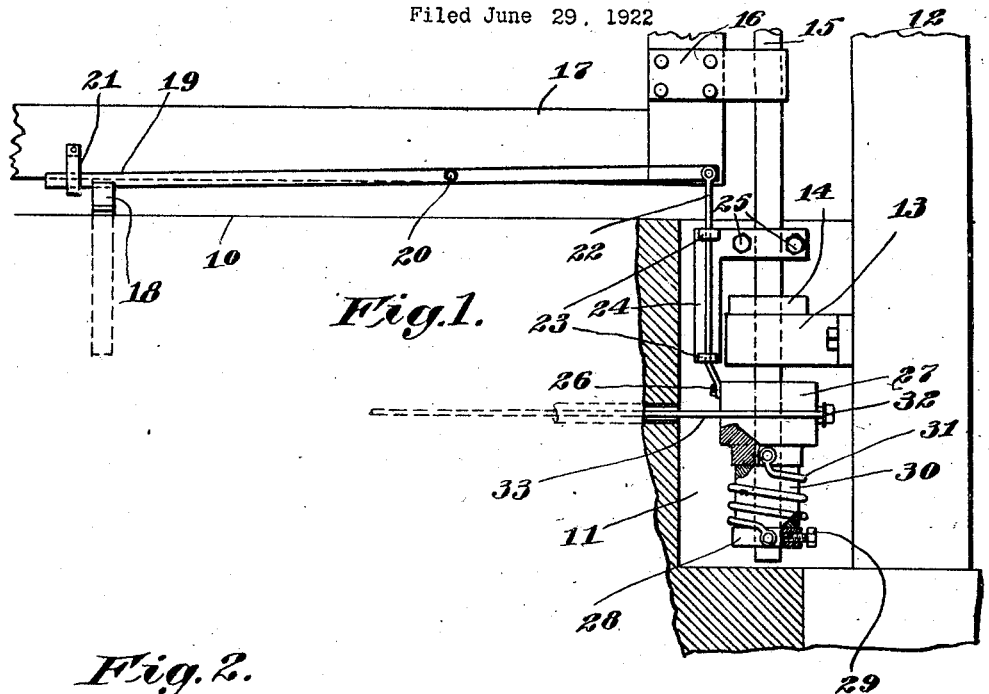
Fig. 1 is a view, partly in section, showing my improved shock absorbing means as applied to an automatically operated gate.

Assuming that my improved device, as illustrated in Fig. 1, has been applied to, and associated with, gate operating means illustrated in Figs. 2 and 3, and assuming further that a vehicle is approaching the gate 17 from the right hand side of Fig. 3. As the wheel 38 engages with the lever 37, such lever is moved from the position shown in full lines of Fig. 3 to that shown in dotted lines and, at the beginning of the movement to the left of the lever 37, the cable 33 rotates the loose pulley 27. The loose pulley 27, in its rotation, tensions the spring 31 and simultaneously exerts a pulling action on the flexible member 22 causing, after a period of time, the release of the latching member 19 from the latch 18. Due to the tension in the spring 31, the gate is, at the instant of its release, given a quick initial movement from the closed to the open position, the rapidity of such movement being determined by the rapidity of the approach of the vehicle towards the gate. When the gate 17 is brought to a stop at its extreme limit of movement, it will be noted that the pulley 27, being loose on the gate post or shaft 15, will allow a certain amount of overthrow of the cable 33 thereby preventing any shock or injury to the operating mechanism of the gate. While the operation of the gate has been described only for the opening movement, it will operate in the same manner and equally well during the closing movement as a vehicle wheel 38 engages with the lever 37 at the left of Figs. 2 and 3.

While I have shown and described the preferred embodiment of my invention somewhat in detail, it will be understood that I may vary the size and arrangement of parts within wide limits without departing from the spirit of the invention.

Having thus described my invention, what I claim as new is:

In a device of the kind described, the combination of a rotatably mounted gate post, a gateway secured to said post and rotatable therewith, a latching member pivotally mounted on the gate and cooperating with the latch to maintain the gate in closed position, a member loosely mounted on said post, an operating lever located at a point remote from the gate, an operating cable extending between said operating lever and the loosely mounted member on the post, a collar secured to the lower end of said post, a helical spring attached one end to said collar and the other end to the loosely mounted member whereby relative movement between the loosely mounted member and post is permitted, and injury to the gate or operating means prevented on sudden stoppage of the gate.

In testimony whereof, I have signed my name to this specification.

FRANK R. ASHLEY.